US008545368B1

(12) United States Patent
Davis et al.

(10) Patent No.: US 8,545,368 B1
(45) Date of Patent: Oct. 1, 2013

(54) REGULATION OF A MACHINE WITH A CONTINUOUSLY VARIABLE TRANSMISSION AND SERVICE BRAKES

(71) Applicant: Caterpillar Inc., Peoria, IL (US)

(72) Inventors: Kevin Davis, Washington, IL (US); Adam Nackers, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/666,210

(22) Filed: Nov. 1, 2012

(51) Int. Cl.
B60W 10/06 (2006.01)
B60W 10/10 (2012.01)
B60W 10/18 (2012.01)

(52) U.S. Cl.
USPC ................................. 477/40; 477/92

(58) Field of Classification Search
USPC ........................ 477/40, 43, 92, 203
See application file for complete search history.

(56) References Cited

U.S. PATENT DOCUMENTS

| 4,056,176 | A |   | 11/1977 | Förster et al. |
| 5,005,442 | A | * | 4/1991  | Sakakibara et al. ............ 477/41 |
| 5,154,267 | A |   | 10/1992 | Watts |
| 5,389,051 | A |   | 2/1995  | Hirate et al. |
| 5,435,795 | A | * | 7/1995  | Mochizuki et al. ............ 477/39 |
| 5,526,261 | A |   | 6/1996  | Kallis et al. |
| 6,063,004 | A | * | 5/2000  | Ibamoto et al. ................. 477/47 |
| 6,217,477 | B1 |  | 4/2001  | Nobumoto et al. |
| 6,223,592 | B1 |  | 5/2001  | Genise |
| 6,240,356 | B1 |  | 5/2001  | Lapke |
| 6,347,680 | B1 |  | 2/2002  | Mianzo et al. |
| 6,385,970 | B1 |  | 5/2002  | Kuras et al. |
| 6,388,407 | B1 |  | 5/2002  | Eguchi |
| 6,474,186 | B1 |  | 11/2002 | Vollmar |
| 6,817,338 | B2 |  | 11/2004 | Janic et al. |
| 7,192,374 | B2 |  | 3/2007  | Kuras et al. |
| 7,296,496 | B2 |  | 11/2007 | Shah |
| 7,400,964 | B2 |  | 7/2008  | Shiiba et al. |
| 7,401,542 | B2 |  | 7/2008  | Stephens et al. |
| 7,641,588 | B2 |  | 1/2010  | Thomson et al. |
| 7,669,580 | B2 |  | 3/2010  | Silbernagel et al. |
| 7,762,923 | B2 |  | 7/2010  | Schuh et al. |
| 7,894,968 | B2 |  | 2/2011  | Stroh et al. |
| 7,972,240 | B2 |  | 7/2011  | Janasek |
| 8,070,651 | B2 |  | 12/2011 | Eastman et al. |
| 8,216,109 | B2 |  | 7/2012  | Dahl et al. |
| 2008/0172162 | A1 | | 7/2008 | Wegeng et al. |
| 2009/0088936 | A1 | | 4/2009 | Hubbard et al. |
| 2009/0112424 | A1 | | 4/2009 | Dahl et al. |
| 2010/0137102 | A1 | | 6/2010 | Sopko, Jr. et al. |

(Continued)

FOREIGN PATENT DOCUMENTS

| EP | 1640640 A1 | 3/2006 |
| JP | 01-244930 A | 9/1989 |
| JP | 2010-078089 A | 4/2010 |

Primary Examiner — Edwin A Young
(74) Attorney, Agent, or Firm — Leydig, Voit & Mayer

(57) ABSTRACT

A method regulates a machine having a continuously variable transmission (CVT) and service brakes in a manner to reduce power transmission through the applied brakes. The method utilizes an unaltered torque-to-speed curve that relates the torque output to the speed output of the CVT. An under-run curve may be applied to the torque-to-speed curve and that corresponds to a target speed. The method may receive an operator input signal indicative of a braking event. In response, the method may shift the torque-to-speed curve to limit the output torque available. The method may also adjust the under-run curve in a manner that maintains correspondence with the target speed.

20 Claims, 7 Drawing Sheets

(56) References Cited

U.S. PATENT DOCUMENTS

| | | |
|---|---|---|
| 2011/0088961 A1 | 4/2011 | Case et al. |
| 2011/0301793 A1 | 12/2011 | Hsieh et al. |
| 2012/0083976 A1 | 4/2012 | Fleming et al. |
| 2012/0136548 A1 | 5/2012 | Hoff |

* cited by examiner

REGULATION OF A MACHINE WITH A CONTINUOUSLY VARIABLE TRANSMISSION AND SERVICE BRAKES

TECHNICAL FIELD

The present disclosure relates generally to a machine equipped with a continuously variable transmission (CVT) and, more particularly, to controlling the power output of the CVT.

BACKGROUND

Many machines use transmissions to couple the output of a prime mover or power source, for example, an internal combustion engine, to a driven element or device such as wheels or a work implement. Transmissions are typically part of a powertrain that transmits power that may be in the form of torque and/or rotational speed from the power source such as an engine to the driven element. Traditional transmissions typically included one or more fixed, selectably engageable gear ratios that could increase or decrease the speed of the prime mover and, usually in an inverse relationship, the torque. Specific gear ratios often correspond to discrete and known outputs of the transmission, including speed and torque. Accordingly, changing the gear ratio may change the speed and torque characteristics of the machine.

Recently, some manufacturers have equipped machines with continuously variable transmissions (CVTs) instead of the conventional, gear-based transmissions. A CVT provides an infinite or continuous range of torque-to-speed output ratios with respect to any given input from the prime mover. In other words, the output of the CVT can be increased or decreased across a continuous range in almost infinitesimally small increments. Thus, a CVT does not engage specific, discrete gear ratios to determine or control its output. Instead, CVTs provide for new and different ways of changing and adjusting the speed and torque characteristics of the machine. Various control methodologies have been developed to utilize the different capabilities of CVTs for these purposes.

Many machines, whether using a conventional, gear-based transmission or a CVT, are equipped with service brakes to slow or stop the machine. Typical service brakes mechanically engage some portion of the powertrain to resist the rotational power transmission that is driving the propulsion devices and propelling the machine. Service brakes may be used in conjunction with other measures to decrease the output of the machine. For example, U.S. Pat. No. 8,070,651 (the '651 patent) describes a method of braking in a machine equipped with a CVT. If the operator actuates a brake actuator such as a foot pedal, the machine may adjust the input-to-output ratio of the CVT to decrease speed as opposed to physically engaging the service brakes. The '651 patent states that the described method may prolong the service life of the physical brakes. According to the '651 patent service brakes are still typically applied in conjunction with adjusting the CVT input-to-output ratio to decrease speed and stop the machine. However, in some instances, the CVT may respond differently than anticipated when the service brakes are applied. The present disclosure addresses similar considerations regarding the combined use of CVTs and service brakes.

SUMMARY

In an aspect, the disclosure describes a method of regulating output of a continuously variable transmission (CVT) producing a CVT output torque and a CVT output speed. The method initially controls the CVT in accordance with a torque-to-speed curve that establishes a generally inverse relation between the CVT output torque and the CVT output speed. The torque-to-speed curve may limit the CVT output torque. An under-run curve may be applied to the torque-to-speed curve and may correspond to a target speed of the machine. The method may further receive an operator input signal indicative of a brake event. In response, the method may shift the torque-to-speed curve to further limit the CVT output torque and may change the under-run curve while maintaining its correspondence with the target speed.

In another aspect, the disclosure describes a machine including a power source operatively coupled to a CVT. The CVT is capable of producing a CVT output torque and a CVT output speed. The machine also includes a propulsion device operatively coupled to the CVT and an operator input device for transmitting an operator input signal to actuate a service brake to brake the propulsion device. The machine may further include a controller communicating with the operator input device and which controls operation of the CVT.

The controller may include a torque-to-speed curve inversely relating the CVT output torque and the CVT output speed. The controller may shift the torque-to-speed curve to further limit the CVT output torque prior to activating the service brake in the event the operator input device is actuated.

In yet a further aspect, the disclosure describes a method of controlling speed of a machine having a continuously variable transmission (CVT) operatively coupled to a power source. The method involves regulating the CVT in accordance with a first torque-to-speed curve limiting a CVT output torque. The method may receive an operator input signal indicating a braking event. The method may convert the operator input signal to a scale factor. The method may then use the scale factor to shift the first torque-to-speed curve to a second torque-to-speed curve to further limit the CVT output torque.

DETAILED DESCRIPTION

Figure 1:
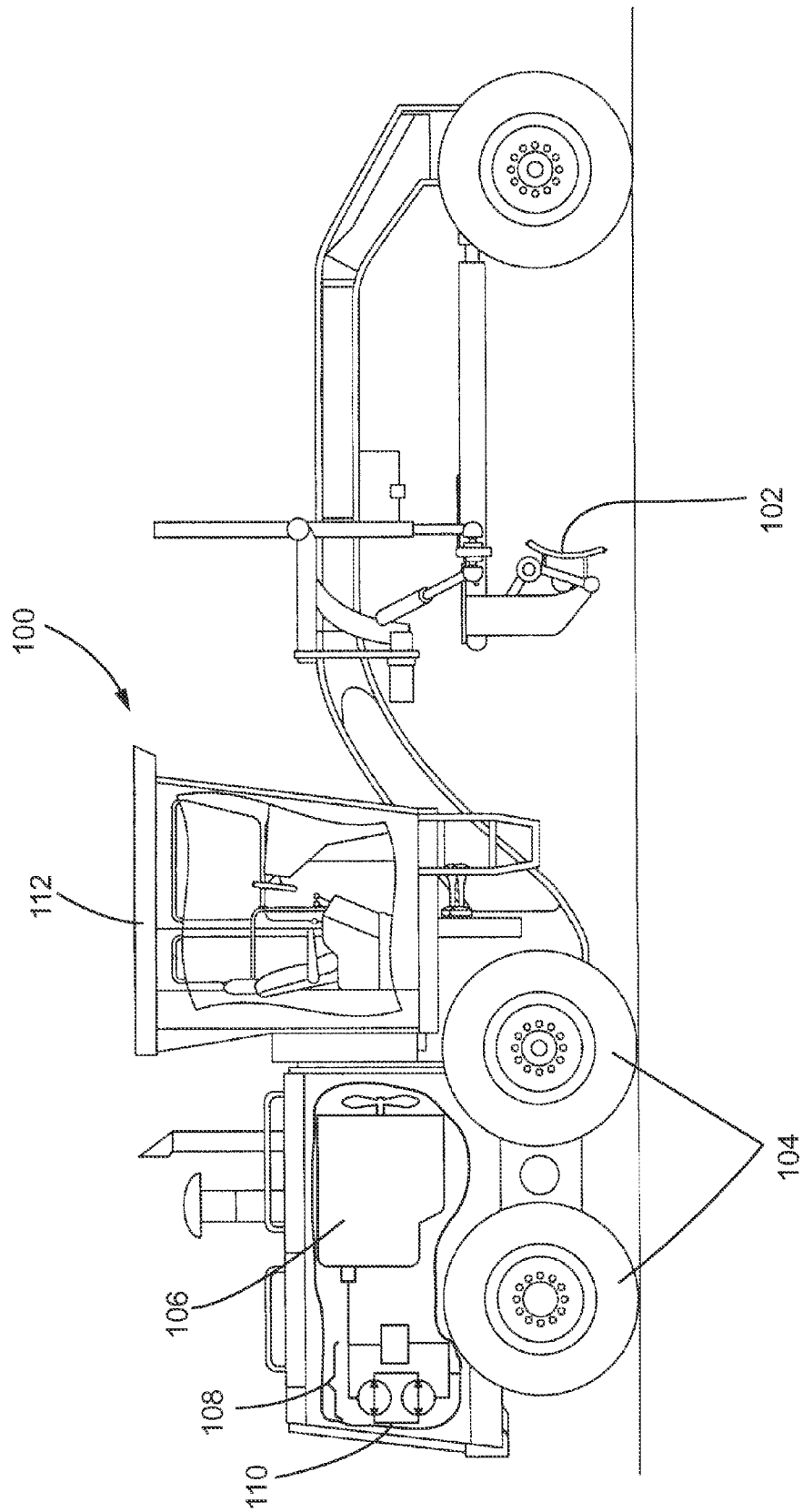
FIG. 1 is a diagrammatical, side elevational view of a mobile machine having a prime mover power source coupled to a driven element through an intermediate CVT.

This disclosure relates to a machine equipped with a continuously variable transmission (CVT) to operatively couple and transfer mechanical power from a prime mover power source to a driven element. CVTs may sometimes be referred to as infinitely variable transmissions (IVTs), however, the disclosure relates to both transmissions and any similar type of transmission regardless of nomenclature. Now referring to FIG. 1, wherein like reference numbers refer to like elements, there is illustrated an embodiment of a machine 100 and in particular a motor grader designed in accordance with the present disclosure. However, the present disclosure is applicable to other types of machines and applications in addition to motor graders. As used herein, the term "machine" may refer to any type machine that performs some operation associated with an industry such as mining, construction, farming, transportation, or any other industry known in the art. For example, the machine may be an earth-moving machine, such as a wheel loader, excavator, dump truck, backhoe, material handler or the machine may be another type of working machine such as a compactors, pavers, etc. Moreover, an implement may be connected to the machine. Such implements can be utilized for a variety of tasks, including, for example, loading, compacting, lifting, brushing, and include, for example, buckets, compactors, fork lifting devices, brushes, grapples, cutters, shears, blades, breakers/hammers, augers, and others. Additionally, the machine can be used in the transportation field such as on-highway trucks, cargo vans, or the like.

The illustrated machine 100 may be capable of alternating between high-speed, over-the-road travel and heavy, load-engaging operation. For example, the machine 100 can include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of the propulsion device may be power-driven to rotate and/or another set may be steerable by an operator onboard, remotely, or by another control scheme.

Power for driving the propulsion devices and/or the attached implement can be provided by a power source 106, sometimes referred to as a prime mover, that is disposed on the machine. A suitable example of a power source 106 is an internal combustion engine, such as a compression ignition diesel engine, that burns a hydrocarbon-based fuel or another combustible fuel source to convert the potential or chemical energy therein to mechanical power that may be utilized for other work. Other suitable types of power sources 106 can include spark-ignition gasoline engines, turbines, hybrid engines, solar powered engines, and the like. To transfer the mechanical power produced by the power source 106 to the propulsion devices 104, the machine 100 can include a powertrain 108 operatively coupling the power source and the propulsion devices. To adjust the speed and/or torque output of the power source, a CVT 110 may be disposed intermediately in the powertrain 108. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power-actuated blade 102.

Figure 2:
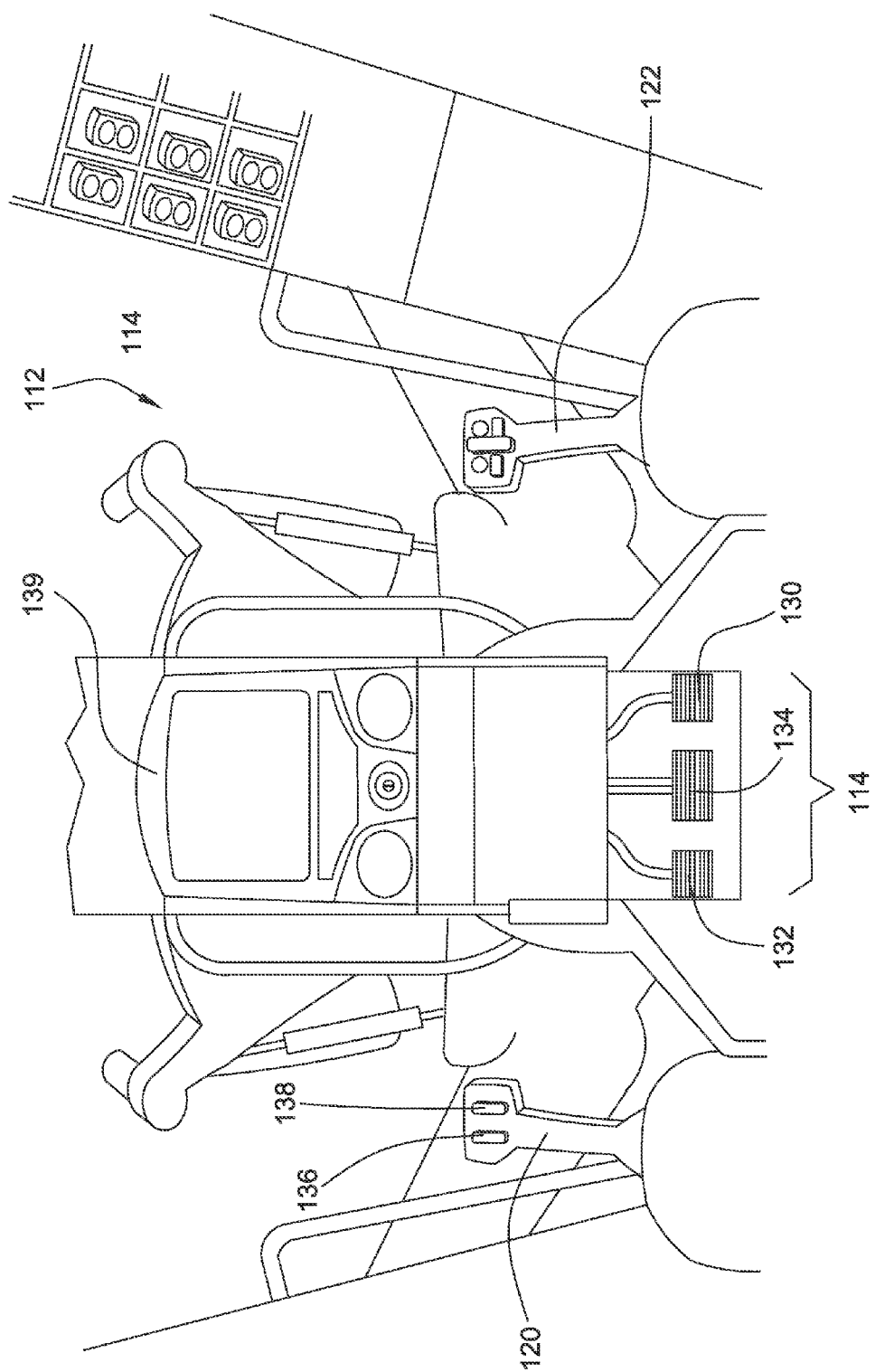
FIG. 2 is a fragmentary perspective view taken from an operator's chair in an operator station for the machine including various accessible, operator-actuated controls and inputs for operating the machine.

To direct operation of the machine 100, an operator station 112 configured to accommodate an operator may be disposed on the machine or remotely in a location that allows visual command over the operating environment. Referring to FIG. 2, various controls and/or inputs 114 with which the operator may interact to maneuver and operate the machine 100 may be accessible inside the operator station 112. The controls and/or inputs illustrated in FIG. 2 are provide by way of example only and may include different arrangements in different embodiments. For example, to steer or control the direction of the machine, a first control column or joystick 120 and a second joystick 122 may be disposed to either side of the operator station 112. The operator may grasp and manipulate the joysticks 120, 122 to adjust operation of the machine or it implements. For example, the first joystick 120 may control steering and the second joystick 122 may control an implement. In other embodiments, a steering wheel or other suitable type of control may be included.

In the illustrated embodiment, the controls may include one or more articulating pedals located toward the floor that an operator may modulate by depressing or releasing with his feet. An operator may depress or release a pedal through a range of displacement to bring about an expected response from the machine. For example, to control or adjust the speed or propulsion of the machine, the pedals may include a first pedal 130 oriented toward the right of the operator station 112 that may function as a throttle pedal. By modulating the first pedal 130, the operator may indicate a desire to accelerate or decelerate the machine so as to increase or decrease the speed or velocity of the machine. The second pedal 132 may function to engage and/or simulate a clutch that may couple and de-couple portions of the powertrain. For example, the operator may modulate the second pedal 132 to direct engagement or disengagement of the CVT from the rest of the powertrain. The center-oriented third pedal 134 may actuate a brake to decrease speed and/or stop the machine. As described below, the third pedal may activate physical brakes or may initiate another methodology to produce the intended result. In other embodiments, controls or inputs other than a pedal, such as levers or the like, may be used to adjust the speed of the machine.

The operator station may also include inputs, controls and indicators regarding the operation of the CVT that may be disposed in the powertrain to transmit power between the power source and the propulsion devices. For example, to change the direction of the machine, a forward-neutral-reverse (F-N-R) selector 136 in the form of a toggle or switch may be disposed in an appropriate accessible location, such as on the first joystick 120. Toggling of the F-N-R selector 136 may change the engagement or operation of the CVT to so that the rotary output propels the machine in the forward or reverse direction, or may it disengage the CVT so that the machine is stayed in a neutral state. If the CVT is configured for a virtual gear methodology simulating a plurality of virtual gears, the operator station 112 may include a virtual gear shifter 138 in the form of a roller or slide switch. Toggling or shifting the virtual gear shifter 138 may cause or simulate shifting between adjacent virtual gear ratios. Various other types of switches, knobs buttons, dials, levers or the like may be included. Other control functionalities may include throttle locks, ignition, work implement controls, and the like. In other embodiments, the controls and operator station may be located remotely from the machine.

To visually interact with the operator, a visual display 139 including a screen or monitor may be provided in the operator station 112. The visual display 139 may display, for example, information regarding operating parameters, performance characteristics, conditions, and variables regarding various aspects of the machine's operation. Common display information may include speed, direction, power source revolutions-per-minute (RPM), engine load, fuel level, and the like. The visual display 139 may be any suitable type of display including a liquid crystal display (LCD), a cathode ray tube (CRT), a plasma display or the like. Additionally, the visual display 139 may be configured to receive input from the operator through touch-screen technology, soft buttons and so forth.

Figure 3:
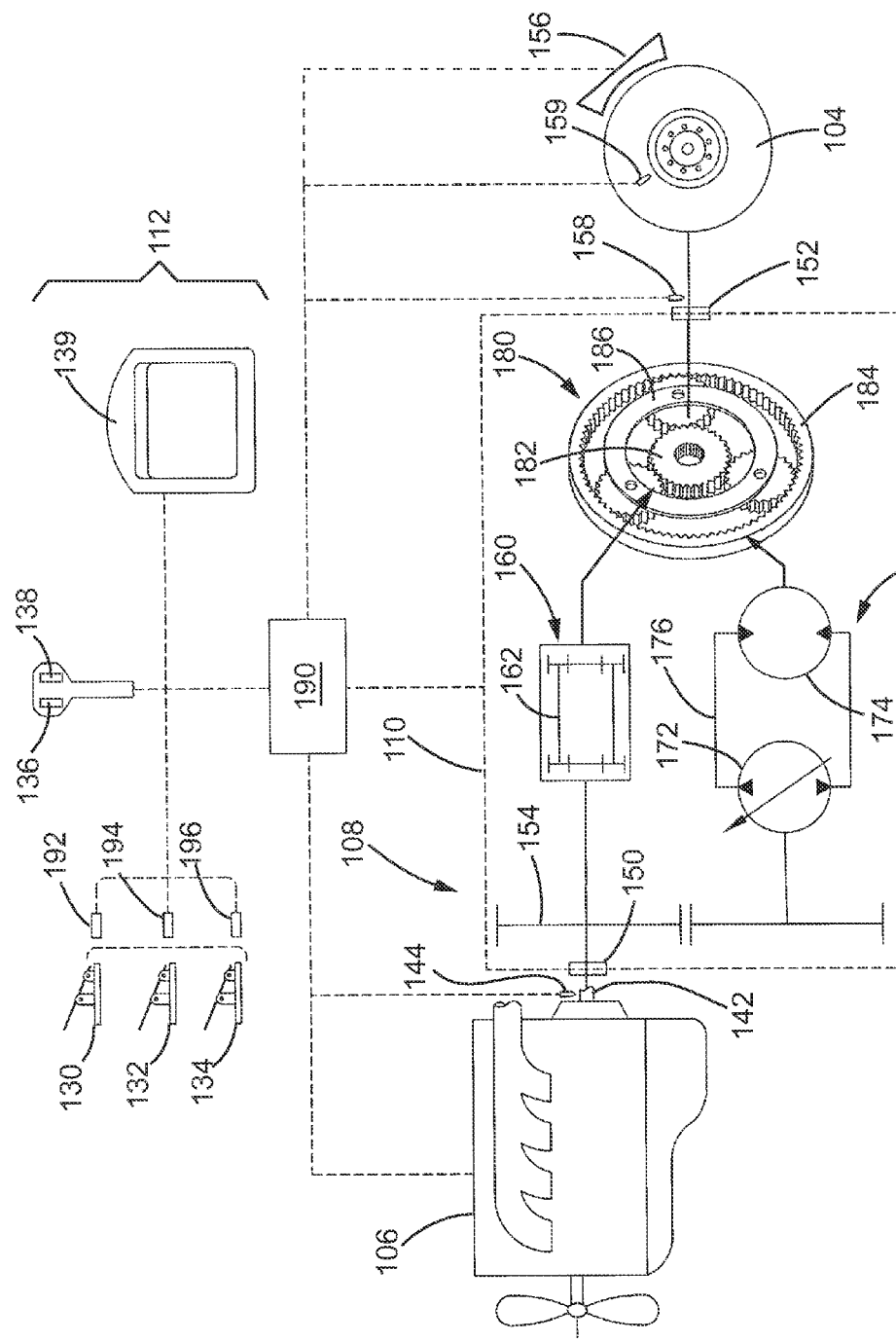
FIG. 3 is a schematic illustration of a powertrain of the machine including an embodiment of a CVT and a controller adapted to operate the CVT using a plurality of virtual gear ratios.

Referring to FIG. 3, an embodiment of the powertrain 108 for transferring mechanical power through the machine is illustrated in more detail. The prime mover power source 106, for example, a diesel-burning internal combustion engine 140, produces rotational power that may rotate a power source output 142, such as a drive shaft, extending from the power source. The power produced by the engine 140 may be quantifiable as speed and/or torque delivered through the power source output 142. To measure the speed and/or torque, a power source sensor 144 may be associated with the power source output 142. The power source sensor 144 may be a magnetic pickup type sensor that may sense a rotating magnetic field associated with a rotating component of the power source output 142 such as a flywheel or drive shaft. In other embodiments, the power source sensor 144 may be an optical pickup sensor that optically reads a visual indication on the rotating component. The speed and, in a somewhat related manner, the torque produced may be selectively varied to an extent by adjusting the operating parameters and inputs to the engine 140.

To adjust the speed and/or torque to a greater degree, for example, by increasing speed and inversely affecting torque, the rotational output of the power source 106 may be directed to the CVT 110 disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, can receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and can convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of the hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will be appreciated by those of skill in the art, the interrelationship and the relative rotation of the various gears in a planetary gear can be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT can be a purely mechanical CVT using a series of selectable, interrelated gear trains such as the gear train 162 in FIG. 3. The purely mechanical CVT may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT may be a purely hydrostatic CVT similar to the hydrostatic power-transfer path 170 in FIG. 3. Furthermore, the CVT may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To measure the rotational output of the CVT 110, a CVT sensor 158, such as a magnet pickup sensor or an optical sensor, may be associated with the CVT output member 152 to sense the rotational speed produced. In another embodiment, the torque output of the CVT 110 may be determined by a sensor disposed in the fluid transfer line 176 that measures hydraulic pressure therein. The torque transfer through the CVT may then be estimated from the measured hydraulic pressure and any possible transmission losses or inefficiencies may be accounted for. The powertrain 108 may terminate at a propulsion device 104, such as a rotatable wheel that engages the ground and propels the machine. Various axles, differentials and the like may facilitate the engagement of the powertrain 108 to the wheel. In the embodiment of FIG. 3, a machine speed sensor 159, such as a magnetic pickup or optical sensor, may be associated with the propulsion device. Machine speed, i.e., distance traveled per time, may be calculated by multiplying the revolutions per second of the wheel by the circumference of the wheel. In general, the machine speed should generally directly correspond to the output speed of the CVT. In other words, controlling the output of the CVT determines the machine speed. However, in some cases, the propulsion devices may be slipping, spinning out or hydroplaning with respect to the ground, in which case the measured machine speed may not equal the CVT output speed. In some embodiments, the machine speed sensor 159 or another sensor may be configured to determine if the propulsion devices are not engaging the ground appropriately.

To decrease the machine speed or to stop the machine, a service brake or service brakes 156 may be operationally associated with the propulsion device 104. The service brakes 156 may engage the propulsion device 104 and may use frictional contact to resist further movement of the propulsion device. For example, the service brakes 156 may include pads, shoes, and/or calipers that may be clamped or pressed against a brake disc or rotator fixed to the propulsion device 104 to inhibit and prevent rotation. Frictional contact between the components of the service brake may convert power, that could otherwise be transferred to or stored as potential energy in the propulsion device and used to propel the machine, into heat. The service brakes 156 may be selectively activated by modulating the center oriented third pedal 134 as described in further detail below. In other embodiments, however, the service brakes 156 may be activated by other inputs and may engage another portion of the powertrain 108 rather than the propulsion device 104. Examples of other types of service brakes include drum brakes, band brakes and the like, and may include non-contacting brake designs such as electromagnetic brakes that utilize electromagnetic repulsion to slow rotational motion of the propulsion device.

To coordinate and control the various components in the powertrain 108 including the CVT 110, the machine may include an electronic or computerized control unit, module or controller 190. The controller 190 may be adapted to monitor various operating parameters and to responsively regulate various variables and functions affecting the powertrain. The controller 190 may include a microprocessor, an application specific integrated circuit (ASIC), or other appropriate circuitry and may have memory or other data storage capabilities. The controller may include functions, steps, routines, control maps, data tables, charts and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer or processor can read. Although in FIG. 3, the controller 190 is illustrated as a single, discrete unit, in other embodiments, the controller and its functions may be distributed among a plurality of distinct and separate components. To receive operating parameters and send control commands or instructions, the controller may be operatively associated with and may communicate with various sensors and controls in the operator station 112 and the powertrain 108. Communication between the controller and the sensors may be established by sending and receiving digital or analog signals across electronic communication lines or communication busses. The various communication and command channels are indicated in dashed lines for illustration purposes.

For example, to register a desired increase or decrease in the speed or power output of the machine with respect to the ground, the controller 190 may communicate with a first pedal sensor 192 associated with and registering articulation of the first pedal 130 intended as a throttle register. The first pedal sensor 192 may generate an operator input signal upon modulation of the first pedal and communicate that operator input signal to the controller 190 that may accordingly adjust operation of one or more components in the powertrain 108 to increase or decrease machine speed and/or output. The controller 190 may also communicate with a second pedal sensor 194 associated with the second pedal 132 that may function as a clutch and with a third pedal sensor 196 associated with the third pedal 134 that may function as a brake. The controller 190 may also communicate with the F-N-R selector 136 to register an input commanding a change in travel direction and may communicate with the virtual gear shifter 138 to register an input commanding a shift of the virtual gears. The controller 190 may also be in communication with the visual display 139 and may send and receive information with the display.

To further assist operation, the controller may also communicate with other sensors or controls disposed about the machine. For example, the controller 190 may communicate with the power source sensor 144 so that the controller may determine the speed or output characteristics of the power source output 142. The controller 190 may also communicate with the CVT sensor 158 to monitor the output of the CVT 110 such as the CVT output speed and/or CVT output torque. The controller 190 may also communicate with the service brakes 156, for example, to selectively engage and disengage the brakes upon receiving an appropriate operator input signal through the third pedal 134 and/or the third pedal sensor 194. To determine the machine speed, the controller 190 may communicate directly with the machine speed sensor 159 associated with the propulsion devices 104. The foregoing description is exemplary and the controller may communicate with other sensors measuring other aspects of the operation of the machine.

Figure 4:
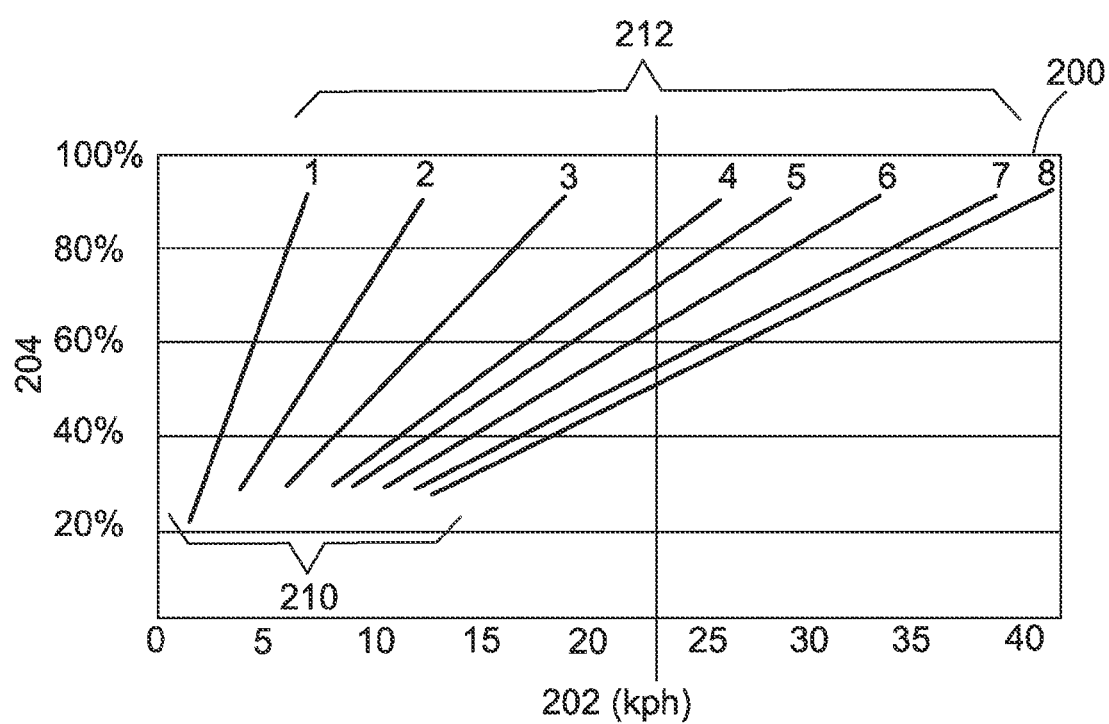
FIG. 4 is an illustration of a control map or chart correlating machine speed to a plurality of virtual gear ratios that may be associated with the CVT.

As mentioned above, the controller may regulate the output speed and/or torque of the CVT within discrete ranges by associating those ranges with a plurality of operator-selectable virtual gear ratios. Any suitable number of virtual gear ratios may be utilized including fractions or increments of discrete virtual gear ratios. The virtual gear ratios may be associated with the forward and/or reverse directions of the machine. Referring to FIG. 4, there is illustrated a virtual gear map 200 for operating a CVT utilizing a series of virtual gear ratios. For example, referring to FIG. 4, the controller may be programmed with a virtual gear map 200 that reflects the relation between machine performance and the plurality of virtual gear ratios that, in the illustrated example, may include gears (1) through (8). The virtual gear map 200 correlates virtual gear ratios (1)-(8) to the available output speeds 202 of the CVT and/or machine plotted along the X-axis. Each virtual gear ratio (1)-(8) is represented as an upward slopping, angled line and each virtual gear ratio has an associated range of virtual gear speeds between a minimum virtual gear speed 210 at the lower end of the line and a maximum virtual gear speed 212 at the higher end. For example, in the illustrated embodiment, virtual gear ratio (1) may have a minimum virtual gear speed 210 that corresponds to an intended machine speed of about 2 kilometers per hour (kph) and may have a maximum virtual gear speed 212 that corresponds to an intended machine speed of about 5 kph. Virtual gear ratio (2) may correspond to an intended machine speed of between about 4 and 12 kph. Virtual gear ratio (8) may have a maximum virtual gear speed corresponding to an intended maximum speed of the machine, e.g., 40 kph.

Thus, the plurality of virtual gear ratios (1)-(8) provide a series of increasing higher and overlapping available speed ranges. The operator may smoothly shift between adjacent virtual gear ratios due to the overlapping speed ranges. Moreover, in various embodiments, the speed ranges for each virtual gear ratio (1)-(8) may generally correspond to known travel speeds of conventional gear-based transmissions. To alter the machine speed within the range available for each virtual gear ratio, the virtual gear map 200 may chart the operator input signal, e.g., modulation of the throttle or first pedal as a percentage 204, along the Y-axis. As the first pedal functioning as the throttle is depressed in increasing degrees of modulation, the output speed of the CVT may increase by following the upward sloping lines associated with each virtual gear ratio (1)-(8). Accordingly, the operator may shift upward through the plurality of virtual gear ratios to direct the CVT and thus the machine to produce increasing output speeds 202 and a wider range of output speeds.

Figure 5:
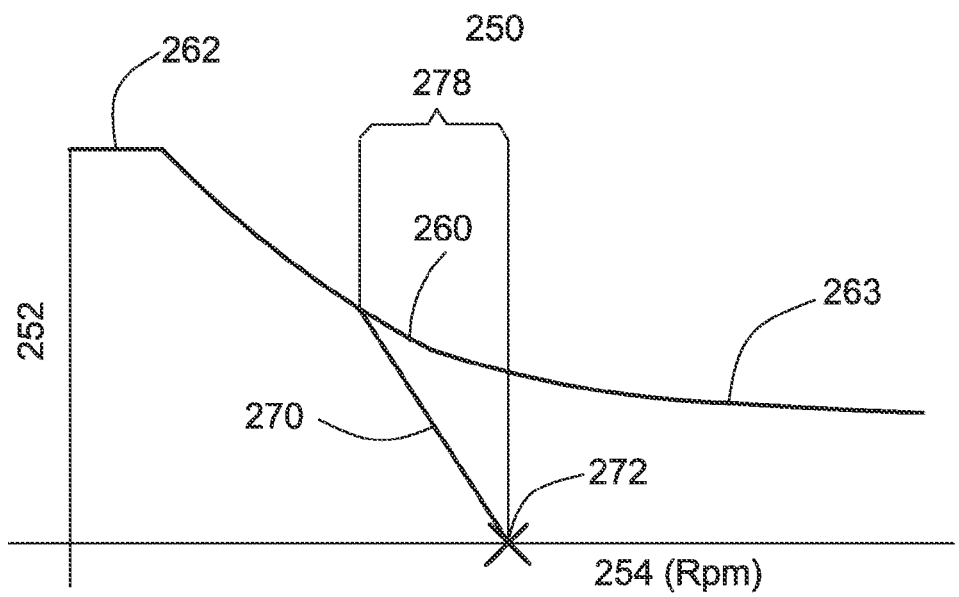
FIG. 5 is a graphical illustration of a torque-to-speed curve and an under-run curve representing the output capacity of the CVT with torque values plotted along the Y-axis and speed values plotted along the X-axis.

Referring to FIG. 5, there is illustrated an embodiment of a chart or map 250 depicting the power output characteristics of the CVT and the powertrain including the relationship between output torque 252 and output speed 254. Output torque 252 may be measured along the Y-axis in any suitable units, such as Newton-meters or foot-pounds, and output speed 254 may be measured along the X-axis in revolutions-per-minute (RPMs). The map 250 may be embodied as one or more control maps that are stored in the memory of the controller and which may assist in operation of the engine. In embodiments that utilized a virtual gear methodology, a different map or chart may exist for each of the plurality of virtual gear ratios.

The output torque 252 and output speed 254 of the CVT are inversely related as exemplified by the first torque-to-speed curve 260, which may be determined empirically by measuring the torque and/or speed delivered at the output of the CVT. In some instances, the first torque-to-speed curve 260 may be referred to as a rimpull curve. It represents the actual output of the CVT and does not account for other transmission losses that may occur down line in the powertrain, such as frictional losses in a differential or axle bearings or rolling resistance between the ground and the propulsion devices. At low speeds, the CVT may be capable of producing high values of torque 252 as indicated by the flat portion 262 of the first torque-to-speed curve 260. However, as the output speed 254 increases along the X-axis, the torque 252 inversely drops as indicated by the downward portion 263 of the curve. This may be because the CVT is converting more of the torque from the power source, i.e., the input power, into speed to increase the RPMs output from the CVT. Accordingly, the flat portion 262 represents low speed, high torque output and the downward portion 263 represents higher speeds, lower torque output. The first torque-to-speed curve 260 may represent the operational limits of the CVT and the machine. The CVT may be set to produce torque and speed at any point under the first torque-to-speed curve 260, including at any point along the curve. To change the CVT operational settings under the first torque-to-speed curve 260, the operator may adjust the various controls and inputs 114 in the operator station 112 shown in FIG. 2.

The first torque-to-speed curve 260 of FIG. 5 may also represent a possible runaway condition in that the speed 254 continues to increase as the decrease in torque 252 begins to level off. If the machine is not engaging a sufficiently high load, or if the propulsion devices begin spinning out, the speed 254 may continue increasing. This may in part be because the CVT is capable of a near infinite range of torque-to-speed ratios. To prevent this condition from occurring, a first under-run curve 270 may be included in the map 250. The first under-run curve 270 is represented as a downward slanted line intersecting the first torque-to-speed curve 270 and the X-axis representing output speed 254.

As an example of the function of the first under-run curve 270, the operator may select a desired or first target speed 272 though the inputs and controls including, for instance, the first pedal functioning as a throttle pedal. The first target speed 272 may be plotted along the X-axis among the available output speeds 254. The first under-run curve 270 may be applied to the map 250 to intersect the first target speed 272 and the first torque-to-speed curve 260. Because of the slope, the first under-run curve 270 may intersect the first torque-to-speed curve 260 at a lower corresponding speed 254 than the first target speed 272. For example, the first under-run curve 270 may intersect the first torque-to-speed curve 260 at an intersection speed 274 that correlates with a lower output speed 254 than the first target speed 272. The degree or amount of offset, indicated by the offset bracket 278 and which is a function of the slope of the first under-run curve 270, may be based on any suitable factor such as, for example, speed. The offset bracket 278 may be quantified as a predetermined percentage or amount less than the target speed 272, although other suitable quantifiers may be used.

As the output performance of the CVT approaches the first target speed 272, for instance, by moving along the first torque-to-speed curve 260, it may intersect the first under-run curve 270 prior to achieving an output speed 254 corresponding to the first target speed 272. Thereafter, the performance of the machine may be regulated in accordance with the first under-run curve 270, slopping downwards until it achieves the first target speed 272. At the first target speed 272, the output of the CVT generally may be producing little or no net torque. If the machine encounters a load, the output speed 254 of the CVT may fall off the first target speed 272 by moving along the first under-run curve 270, allowing the CVT to produce more torque 252 to overcome the resistance presented by the load. The map 250 therefore may regulate performance of the machine to avoid speed runaway by limiting achievable speeds and/or torque outputs with the first under-run curve 270.

Different under-run curves 270 may exist and be incorporated into the map 250 for different target speeds 272. The slope of the under-run curves 270 and thus the offset bracket 278 may change depending upon where the target speed 272 is established along the X-axis. For example, if the first target speed 272 is established nearly underneath the flat portion 262 of the first torque-to-speed curve 260, the first under-run curve 270 may need to dissipate a significant amount of torque 252. According, the slope of the first under-run curve 270 may be smaller (i.e. more steep) at lower speed values than at higher speed values of the first target speed 272. The size or value of the offset bracket 278 may relatedly change.

Referring to FIG. 3, if during a braking event the service brakes 156 are applied to slow or stop the machine, for example, by frictionally engaging the propulsion devices 104, the CVT 110 may attempt to overcome the resistance offered by the service brakes by increasing the power output. For example, the CVT 110 may interpret the application of the service brakes 156 as an additional load or power requirement that the CVT is supposed to meet. If unaccounted for, the CVT 110 may increase its torque output until the CVT reaches its stall torque, at which point the CVT is unable to continue transmitting a rotational motion through the CVT output member 152. This may reduce the operational life of the service brakes 156 and may overheat and possibly damage the CVT 110. For example, if the CVT output member 152 is prevented from rotation by application of the service brakes 156 and the CVT 110 stalls, the components of the CVT may begin overheating because the CVT is attempting to dissipate the net power output of the power source 106 in the form of heat, as opposed to transmitting the power output to the propulsion device. As a related matter, the efficiency of the machine may also be reduced under such conditions.

Figure 6:
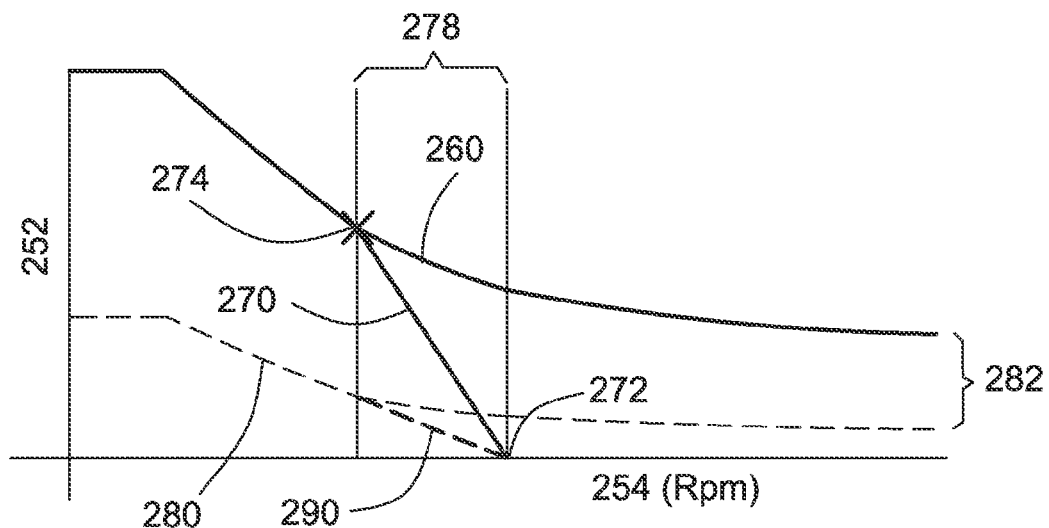
FIG. 6 is a graphical illustration of the torque-to-speed curve and the under-run curve of FIG. 4 as modified to reduce the torque and/or speed output of the CVT.

To prevent or reduce the likelihood of such events, the controller 190 may alter or adjust the torque-to-speed curve and/or under-run curve so that the CVT 110 does not attempt to power through the service brakes 156. For example, by communicating with the third pedal sensor 196, the controller 190 may determine when an operator during a braking event begins to actuate the third pedal 134 to command application of the service brakes 156. In response, the controller 190 may adjust or shift the curves in a manner that further limits the CVT output torque. Referring to FIG. 6, for example, the adjustments may shift the first torque-to-speed curve 260 downwards with respect to the Y-axis to reduce the output torque 252 available or that the CVT is capable of producing. This may be indicated by the second torque-to-speed curve 280 represented as a dashed line. The amount that the second torque-to-speed curve 280 is shifted from the first torque-to-speed curve 260 may be referred to as a first shift value 282, indicated as a bracket. The second torque-to-speed curve 280 corresponds to lower values of output torque 252 along the Y-axis, thereby limiting the output capabilities of the CVT. The shift value 282 between the first and second torque-to-speed curves may be consistent or may vary with respect to different output speeds 254 along the X-axis.

In addition to shifting the second torque-to-speed curve 280 downwards, the first under-run curve 270 may also be adjusted in response to activation of the brake or third pedal. In the illustrated embodiment, the target speed 272 may remain the same but the map 250 may apply a second under-run curve 290 which has different slope characteristics. Furthermore, in the illustrated embodiment, the second under-run curve 290 may intersect the second torque-to-speed curve 280 at approximately the same intersection speed 274. Accordingly, the second under-run curve 290 corresponds to the same approximate range of output speeds 254 along the X-axis as the first under-run curves 270, as indicated by the offset bracket 278. However, in other embodiments, the intersection speed 274 may also be adjusted with respect to the second torque-to-speed 280 and second under-run curve 290 so that the control map 250 may include different first and second intersection speeds.

Figure 7:
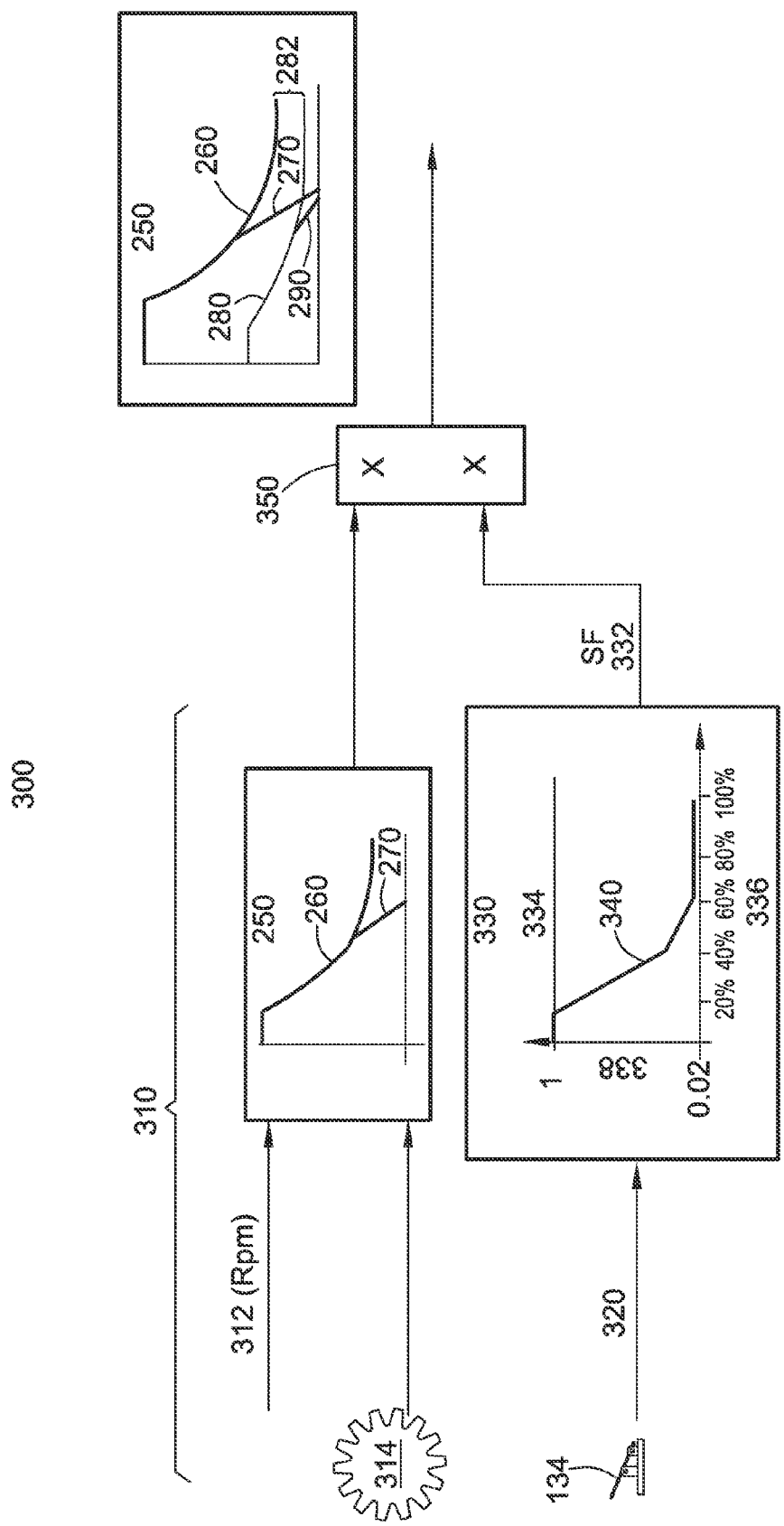
FIG. 7 is a schematic illustration of a representative control strategy for modifying the torque-to-speed curve as depicted in FIG. 6 upon receiving an operator input signal from an operator input device.

To determine the amount or degree that the torque-to-speed curve is shifted, the controller may execute a series of instructions associated with a control strategy such as, for example, the control strategy 300 illustrated in FIG. 7. The control strategy 300 may be composed of any suitable types of software routines, functions, modules, objects, classes, data structures, methods, record, libraries etc., or any of the same implemented in hardware, collectively referred to herein as routines. The control strategy 300 may initially select a control map 250 having torque-to-speed criteria described above to regulate operation of the CVT. Because the appropriate map 250 may depend upon the current operating parameters of the CVT and/or the machine, the control strategy 300 may include a control map determination routine 310. For example, to determine the current or requested speed conditions, the control map determination routine 310 may receive a speed input 312 that may be indicative of the CVT output speed or that may correspond to the actual travel speed of the machine. Referring to FIG. 3, the speed input 312 may be determined from the CVT sensor 158, the machine speed sensor 159, or from the first pedal sensor 190 that measures modulation of the first pedal 130 that may function as a throttle pedal. As may be appreciated, an actual or intended speed of the machine may be inferred from these or other suitable inputs. The speed input 312 may be quantified in RPMs.

In the embodiments in which the CVT is associated with a plurality of virtual gear ratios, the map 250 to be selected for regulating the CVT may be dependent upon the selected gear ratio. Accordingly, the control map determination routine 310 may communicate with the virtual gear shifter 138 of FIG. 3 to receive a virtual gear input 314 indicating the selected virtual gear ratio. The control map determination routine 310 may use the speed input 312 and the virtual gear input 314 to select the appropriate control map 250, including an unaltered first torque-to-speed curve 260 and first under-run curve 270, from among the plurality of possible control maps associated with the controller. Absent further operator input, the controller may regulate the CVT in accordance with the first control map 250.

If, however, the operator begins to actuate the service brakes 156, the control strategy may adjust the control map 250 to lower or limit the output torque of the CVT 110. To register initiation of a command to brake the machine, the control strategy 300 may communicate with the sensor associated with the third pedal 134. Operator modulation of the third pedal 134 may be translated into an operator input signal and, in particular, a brake input 320, that is communicated to the control strategy 300. Because the brake input 320 is a scalable factor, i.e., it may be resolved into constituent sub-values or factors, the control strategy 300 may direct the brake input to a scaling routine 330 for conversion into a value that may be more readily interpreted by the rest of the control strategy 300. For example, the scaling routine 330 may convert the brake input 320 into a scale factor (SF) 332 that may have a value between 0.02 and 1.0. Values of the SF 332 between 0.02 and 1.0 may correspond to intermediate degrees of modulation of the third pedal between fully depressed and fully released.

To accomplish scaling or resolving the brake input 320 into the SF 332, the scaling routine 330 may include a scaling table or scaling chart 334 that registers the magnitude of the brake input 320 (e.g., pedal modulation as a percentage) along the X-axis 336 with the range of possible scale factors between 0.02 and 1.0 on the Y-axis 338. In the present embodiment, the value of 0.02 may be assigned as the lowest possible SF to avoid potential computational errors that may occur if a value of 0.0 is used, but in other embodiments, any other suitable number including 0.0 may be assigned as the lowest SF. A reference line 340 may be plotted through the scaling chart 334 to correlate various amounts of brake input 320, as indicated along the X-axis 336, to a particular SF, as presented along the Y-axis 338. The scaling routine 330 may thereby normalize the brake input 320 to a value better suited for further processing in the control strategy 300.

To combine the SF 332 and the selected control map 250, the control strategy 300 may include a multiplication routine 350 that multiplies or otherwise processes the two values together. In particular, the multiplication routine 350 may adjust the first torque-to-speed curve 260, in particular, by shifting it to the second torque-to-speed curve 280 corresponding to a lower limit on the available output torque. The control strategy 300 may thereafter regulate operation of the CVT in accordance with shifted second torque-to-speed curve 280. The difference between the first torque-to-speed curve 260 and the second torque-to-speed curve 280 may be equal to the shift value 282. The multiplication routine 350 thereby adjusts the control map 250 by the brake input 320 commanded by the operator. Specifically, the amount that the third pedal 134 is depressed is reflected in the SF 332 and, by combination of the SF and the control map 250 in the multiplication routine 350, is proportionally reflected in the second torque-to-speed curve 280. The relative position of the second torque-to-speed curve 280 will be a function of the amount or degree of the adjustable brake input 320. In an embodiment, the under-run curve 270 may likewise be adjusted to the second under-run curve 290 in accordance with the SF 332.

INDUSTRIAL APPLICABILITY

Figure 8:
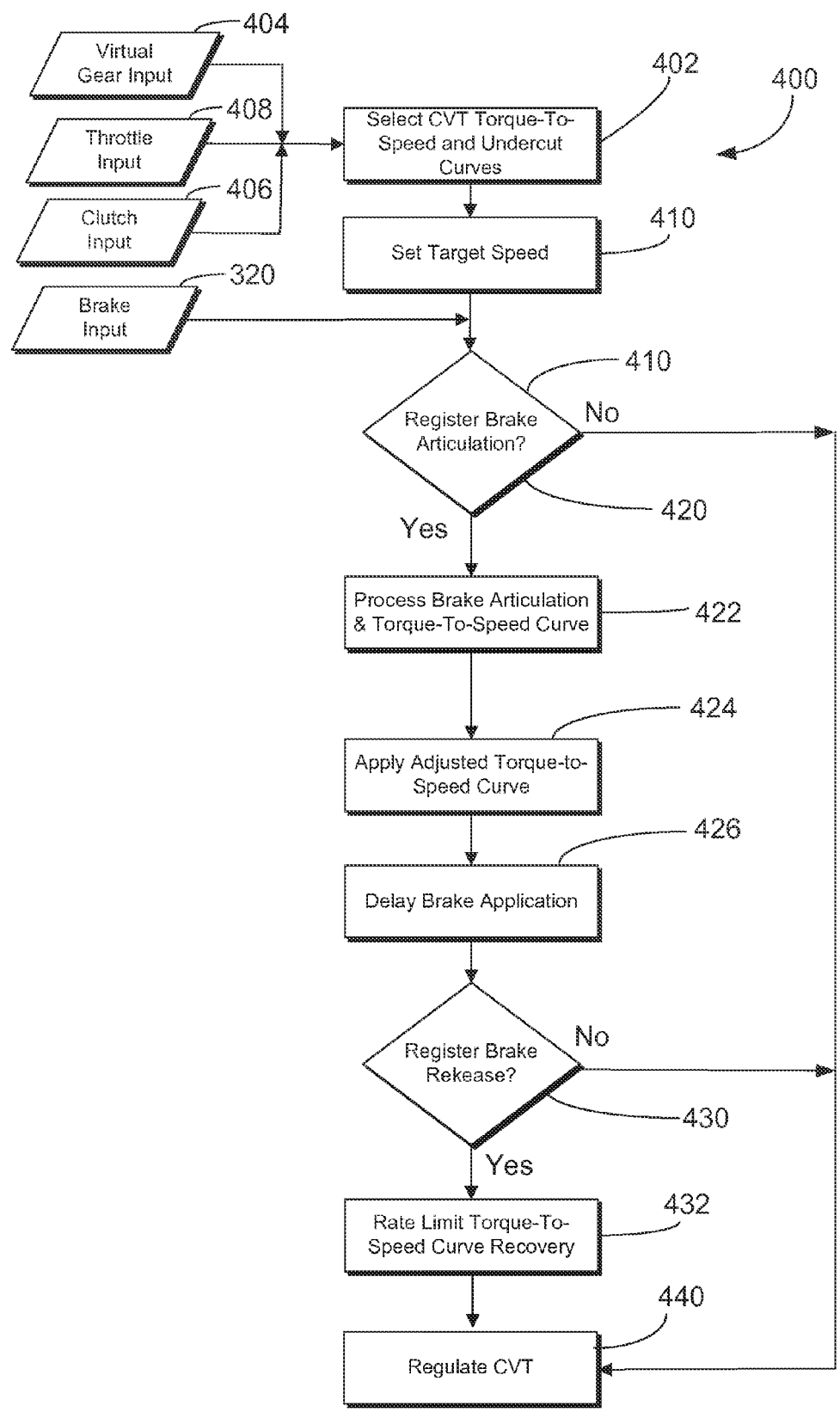
FIG. 8 is a flowchart illustrating a possible routine for regulating the braking action to reduce speed in a machine equipped with a CVT.

In accordance with an aspect of the disclosure, a CVT may be regulated in a manner to reduce friction losses and possible stalling consequences that may arise during the application of service brakes to slow or stop the machine. For example, referring to FIG. 8, there is illustrated an embodiment of a flowchart 400 to facilitate braking in such a machine. The steps and actions described by the flowchart 400 may be set forth in computer-readable instructions accessible by and executable in the controller 190. In an initial selection step 402, the flowchart 400 may select a control map including an unadjusted torque-to-speed curve and an unadjusted under-run curve to regulate the CVT. In making the selection, the selection step 402 may receive operator input signals such as, for example, a virtual gear input 404, a throttle input 406, and possibly a clutch input 408 indicative of a requested machine speed. Referring to FIG. 3, the virtual gear input 404 may be communicated from the virtual gear shifter 138, the throttle input 406 may be communicated from the first pedal sensor 192 associated with the first pedal 130, and the clutch input 408 may be communicated from the second pedal sensor 194 associated with the second pedal 132 simulating a clutch.

Based on the virtual gear input 404, the throttle input 406 and the control map selected by the selection step 402, the flowchart 400 may set a target speed for the machine in a targeting step 410. As described above, the target speed may determine how the torque-to-speed curve and the under-run curve are arranged.

If the operator begins to depress the third pedal 134, indicating a desire to slow or stop the machine, the controller 190 executing the flowchart 400 may take measures to reduce the CVT output torque that would otherwise be transmitted and applied to the service brakes 156. For example, to register modulation of the third pedal 134, the flowchart 400 may include a first registration step 420 that may communicate with the third pedal sensor 196. If the first registration step 420 does not register an operator input signal indicative of a braking event, the flowchart 400 may proceed to a regulation step 440 and regulate the CVT in accordance with the selected control map configured in accordance with the target speed determined by the targeting step 410.

However, if the first registration step 420 receives an operator input signal, in particular, a brake command or brake input 320 from the third pedal sensor 196, the flowchart 400 may proceed to processing the brake input in a processing step 422. In particular, the processing step 422 may determine the amount that the third pedal or other brake input device is modulated or articulated by the operator. This may be accomplished by resolving or factoring the brake input 320 into a SF as described above. The determined amount or SF may be applied, in an application step 424, to adjust the selected control map, for example, by shifting or adjusting the torque-to-speed curve and/or under-run curve, in a manner that may limit the available torque output of the CVT. The application step 424 may use the adjusted control map to thereafter regulate operation of the CVT.

In an embodiment, application of the adjusted torque-to-speed curve to control operation of the CVT may occur before the service brakes 156 physically engaged with the propulsion devices 104 or another portion of the powertrain 108. For example, referring to FIG. 8, the flowchart 400 can include a delay step 426 that delays physical actuation of the service brakes until the adjusted torque-to-speed curve has limited the output torque of the CVT as part of the application step 424. In an embodiment, the delay step 426 may utilize a timer, counter or similar device that temporarily delays the physical application of the service brakes for a predetermined amount of time, or the delay step may employ a rate limit strategy that prevents brake application until the output torque of the CVT had been reduced to a predetermined limit. In another embodiment, the delay step 426 may be realized by the design of the third pedal 134, which may be configured so that the service brakes are not engaged for a predetermined range of initial pedal depression, for example, 20%. Instead, the operator's initial depression of the third pedal 134 within the predetermined range may result in adjusting the torque-to-speed curve and limiting the available CVT output torque prior to applying physical resistance by the service brakes. According, the torque applied to the propulsion device 104 may have already been reduced by the time that the service brakes 156 are applied such that the brakes encounter less opposing force. If the pedal depression exceeds the predetermined range or threshold, the service brakes may be applied. This may be beneficial in an emergency situation when the pedal is rapidly depressed to promptly apply the service brakes.

In another embodiment, to prevent the machine from suddenly moving or lurching if the service brakes 156 have been released, the flowchart may also be configured to delay recovery of the CVT operation. For example, in a second registration step 430, the flowchart 400 may monitor the third pedal 134 or similar brake input device to determine if the brake input signal has ceased or terminated. If not, the flowchart may continue to regulate the CVT output in accordance with the adjusted torque-to-speed curve in the regulation step 440. However, if the operator does release the third pedal 134 such that the brake input terminates, the second registration step 430 may proceed to a recovery limiting step 432 to delay the recovery or re-shifting of the adjusted second torque-to-speed curve 280 back to the unadjusted first torque-to-speed curve 260 in FIG. 5. The recovery limiting step 432 may be realized as a timer, counter or as a rate limiting strategy. Accordingly, upon release and disengagement of the service brakes 156, the torque and/or speed outputs of the CVT may still be limited and acceleration of the machine may occur gradually.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of regulating output of a continuously variable transmission (CVT), the CVT producing a CVT output torque and a CVT output speed; the method comprising:
controlling the CVT in accordance with an torque-to-speed curve establishing a generally inverse relation between the CVT output torque and the CVT output speed, the torque-to-speed curve limiting a CVT output torque;
applying an under-run curve to the torque-to-speed curve, the under-run curve corresponding to a target speed;
receiving an operator input signal indicative of a brake event;
shifting the torque-to-speed curve to further limit the CVT output torque; and
changing the under-run curve while maintaining correspondence with the target speed.

2. The method of claim 1, wherein the operator input signal is resolvable into factors.

3. The method of claim 2, further comprising converting to the operator input signal to a scale factor, and the step of shifting the torque-to-speed curve is done proportional to the scale factor.

4. The method of claim 3, further comprising actuating a service brake after shifting the torque-to-speed curve by a predetermined time.

5. The method of claim 4, further comprising recovering the torque-to-speed curve upon termination of the operator input signal.

6. The method of claim 5, further comprising delaying re-shifting of the torque-to-speed curve to avoid sudden acceleration of the machine.

7. The method of claim 3, further comprising actuating a service brake after the CVT output torque has been limited to a predetermined amount.

8. The method of claim 3, further comprising actuating a service brake after the operator input signal has exceed a predetermined threshold.

9. A machine comprising:
a power source;
a continuously variable transmission (CVT) operatively coupled to the power source, the CVT producing a CVT output torque and a CVT output speed;
a propulsion device operatively coupled to the CVT for propelling the machine;
an operator input device for transmitting an operator input signal to brake the propulsion device;
a service brake for physically braking the propulsion device; and
a controller communicating with the operator input device and controlling operation of the CVT, the controller including a torque-to-speed curve inversely relating the CVT output torque and the CVT output speed, wherein the controller shifts the torque-to-speed curve to limit torque prior to activating the service brake upon actuating of the operator input device.

10. The machine of claim 9, wherein the controller further includes an under-run curve applied to the torque-to-speed curve, the under-run curve corresponding to a target speed of the machine and limiting the CVT output speed.

11. The machine of claim 10, wherein the controller adjusts the under-run curve while maintaining correspondence with the target speed.

12. The machine of claim 11, wherein the operator input signal is scalable, and the controller converts the operator input signal to a scale factor.

13. The machine of claim 12, wherein the torque-to-speed curve is shifted proportionally to the scale factor.

14. The machine of claim 13, wherein the CVT is associated with a plurality of virtual gear ratios, each virtual gear ratio of the plurality of virtual gear ratios each including a range of virtual gear speeds between a minimum virtual gear speed and a maximum virtual gear speed.

15. The machine of claim 14, further comprising a second operator input device generating a second operator input signal indicative of a throttle input; and a third operator input device generating a third operator input signal indicative of a selected virtual gear ratio, and the target speed is determined in part by the second operator input signal and the third operator input signal.

16. A method of controlling speed of a machine having a continuously variable transmission (CVT) operatively coupled to a power source, the method comprising:
- regulating the CVT in accordance with a first torque-to-speed curve limiting a CVT output torque;
- receiving a first operator input signal indicating a braking event, the first operator input signal being scalable;
- converting the first operator input signal to a scale factor, and
- shifting the first torque-to-speed curve to a second torque-to-speed curve further limiting the CVT output torque in accordance with the scale factor.

17. The method of claim 16, further comprising applying a first under-run curve to the first torque-to-speed curve, the first under-run curve corresponding to a target speed of the machine; and
- adjusting the first under-run curve to a second under-run curve in response to the first operator input signal while maintaining correspondence with the target speed.

18. The method of claim 17, wherein the first torque-to-speed curve and the first under-run curve intersect at an first intersection speed, and the second torque-to-speed curve and the second under-run curve intersect at a second intersection speed that is substantially the same as the first intersection speed.

19. The method of claim 18, further comprising delaying recovery of the first torque-to-speed curve upon termination of the first operator input signal.

20. The method of claim 19 further comprising delaying engagement of a service brake until after the second torque-to-speed curve has limited the CVT output torque.

* * * * *